Patented Sept. 1, 1953

2,650,880

UNITED STATES PATENT OFFICE 2,650,880

FOOD PRODUCT

Arvid M. Erickson, San Jose, Calif., assignor, by mesne assignments, to Hawaiian Pineapple Company, Limited, Honolulu, Territory of Hawaii, a corporation of Hawaii No Drawing. Original application October 1, 1941, Serial No. 413,165, now Patent No. 2,499,375, dated March 7, 1950. Divided and this application June 4, 1949, Serial No. 97,305

10 Claims. (Cl. 99—102)

This invention relates to the processing of foods and the resulting products. More particularly it relates to the processing of fruits and to the resulting fruit products.

This application is a division of the copending application of Arvid M. Erickson, Serial No. 413,165, filed October 1, 1941, and now Patent Number 2,499,375.

It has long been known that sucrose or ordinary cane or beet sugar is not a particularly good medium to add to fruit for the purpose of increasing the sweetness of the fruit. It has, nevertheless, been substantially the only sweetening medium employed for this purpose because it has been the only sweetening medium available in sufficient quantities of reasonable purity at a reasonable price. This almost universal use of sucrose in fruit products has continued despite the fact that many persons are unable to consume it or products prepared with it, and despite the fact that it differs very materially in composition from the natural sugars of the fruit so that its addition to fruit results in certain undesirable changes in the fruit.

Numerous attempts have been made heretofore to provide a sweetening medium particularly suited for fruit, which medium would include as sweetening ingredients a very substantial quantity of sugars such as are naturally present in the fruit, thus providing a sweetening medium more compatible with the fruit and at the same time providing sweetened fruit products which may be consumed by anyone who is able to eat raw fruit.

Fruit products sweetened with media other than cane syrup have not proven satisfactory commercially, however, or have had only a limited commercial acceptance because they have a distinctive taste or flavor unacceptable to many persons, or because they are not sufficiently sweet. There have been three general sources of media containing sugars such as those naturally occurring in fruit. These sources are fruits themselves, honey and sucrose, from which latter material the fruit sugars are derived by inversion. The difficulty with honey has been that the better grades are too costly and the poor grades are too impure and too strong in odor and flavor. The media derived from fruits themselves have not had sufficient sweetening power, and have included purification reagents as such, or in the form of salts in undesirable quantities, and the media prepared by inversion of sucrose have also been both expensive, and in many cases, too impure to be suitable. They have only been used for special purposes, such as in the preparation of dried or candied fruits, and have not been employed, for example, in the preparation of commercial canned fruits.

It is an object of this invention to provide fruit compositions at least in part sweetened with sweetening media the principal sweetening ingredients of which are sugars naturally occurring in fruit.

Another object is to provide fruit compositions sweetened at least in part with added sweetening media derived from fruit and having substantially the same sugar composition as fruit.

A further object is to provide fruit compositions sweetened with added sweetening media derived from fruit by a refining process which eliminates constituents having a distinctive odor and flavor, and constituents which detract from the sweetening power of the natural sugars, which refining process does not, however, materially affect the natural sugars themselves.

Still another object is to provide canned fruit products consisting of fruit and a syrup derived from fruit, which syrup analyzes to substantially the same sugar composition as fruit but is substantially free of materials which detract from the sweetening power of the sugars, such as acids and ash-forming materials, and which syrup is also free of constituents having a distinctive odor and/or flavor.

Another more particular object is to provide fruit compositions comprising an added sweetening syrup derived from fruit, which syrup is substantially free of materials which detract from the sweetening power of the sugars, such as acids and ash-forming materials, and which syrup is also free of constituents having a distinctive odor and/or flavor.

Other objects will appear hereinafter.

It has now been found that the foregoing objects may be accomplished by including in fruit compositions a sweetening medium derived from fruit which sweetening medium preferably is also free of the characteristic odor and flavor of fruit. By the term "sweetening medium" is meant a medium containing sweetening ingredients and which is substantially free of materials which detract from the sweetening power of the sweetening ingredients present, such as acids and ash-forming materials including not only acids and ash-forming materials associated with the sugars or sweetening ingredients in the natural state but also those added during the refining process. Suitable sweetening media of this type may be prepared from fruit as disclosed in the copending application of Arvid M. Erickson and John D.

Ryan, Serial No. 413,164, filed October 1, 1945, and the Patent No. 2,385,801 issued to Arvid M. Erickson and John D. Ryan on October 2, 1945. For example, such sweetening media are prepared from fruits, either whole fruits or fruit in other forms such as dried fruits, for example raisins, by treating the juice of the fruit before or after separation from the pulp with divalent alkaline material and with an acid such as phosphoric acid in such manner as to eliminate substantially the acids and ash-forming materials originally present in the fruit, as well as the acid and alkaline reagents added in the refining process whereby a syrup is produced, which contains the sugars of the fruit and is a sweetening medium because it is free of materials which detract from the sweetening power of the sweetening ingredients, all as described in the above identified co-pending application and patent.

As indicated above, the invention is applicable to fruit compositions generally. It is particularly applicable to the preparation of canned fruit products, especially pure fruit juices, fruit nectars, fruit jams, preserves and other fruit specialties, and pieces of fruit or whole fruit packed in varying ratios of syrup of varying sugar content. By way of illustration, grapefruit may be mentioned among juices as one which may be improved by the addition of sweetening media in accordance with the present invention. A representative nectar which is a composition of fruit, water and sugar may be made from apricot pulp and the sweetening medium employed in accordance with this invention. Very superior canned fruit compositions may be prepared in accordance with this invention from apricots, peaches, Bartlett pears, Royal Anne cherries and the like.

In accordance with the present invention the fruit compositions are prepared by mixing the sweetening medium with the fruit in the form of a syrup or aqueous solution which has been brought to the desired Brix concentration. Where Brix concentration or degrees Brix are mentioned in this specification and claims the degrees Brix are to be understood as being the same as percentage by weight of dissolved solids; in other words, a syrup of 15° Brix contains 15% by weight of dissolved solids. Except in so far as the Brix concentration of the syrups may be different due to the greater sweetening power of the sugars present as compared with sucrose and/or due to the harmonious blend of these syrups with the fruit, the preparation of fruit compositions in accordance with the present invention does not differ materially from the preparation of fruit compositions sweetened with sucrose syrup as now carried out commercially. The invention does, however, contemplate the preparation of certain fruit compositions not presently prepared commercially but which are made attractive commercially by reason of the present invention such as, for example, a sweetened grapefruit juice, or fruit compositions which would not normally be said to be sweet, but which include sufficient of the sweetening media employed in accordance with this invention to produce a ripening effect, as described more fully hereinafter.

In order that the invention may be better understood the following example is included. This example is to be construed as illustrative only and not as limiting the scope of the invention.

*Example*

Number 1 tall-size cans (one pound and six ounces total contents) were packed with approximately a sixty percent fill of peeled, halved, cored and stemmed Bartlett pears. The containers were then filled with a 30° Brix syrup derived from raisins. This syrup was prepared by treating an aqueous extract from the raisins with lime and phosphoric acid. It was clear, water-white, substantially free of a distinctive odor and flavor and of materials which detract from the sweetening powers of sugar, such as acids and ash-forming materials. The containers after filling with the syrup were vacuum sealed and processed for twenty minutes at 212° F. after which they were cooled and stored.

Although the above example is concerned with only a particular type of fruit composition, it is believed that it sufficiently illustrates the present invention with respect to all types of fruit compositions. As is well known, the proportions of sweetening media now added in the preparation of fruit compositions, as well as the conditions of processing, vary not only depending upon the particular manufacturer who is preparing the fruit composition, but also depending upon the grade and type of fruit and the ripeness thereof.

In the last analysis, the amount of sweetening ingredient added depends, of course, upon the desired sweetness of the final product. Therefore no exact standards can be set up. In general, however, it will be found that the sweetening ingredients, used in accordance with the present invention, will exert a greater sweetening effect on a weight basis than does cane sugar. The sugars naturally occurring in fruits have a sweetening power which is on the order of one and a half times that of sucrose on a weight basis. This, of course, is merely indicative and not controlling, because the ultimate test is the taste of the final product. Due to the more harmonious blending of the sweetening media added in accordance with this invention as compared with sucrose, the amount of such sweetening media added will, in many cases, have no definite relation of any sort to the amount of sucrose employed in similar compositions. From the foregoing it will be apparent that any desired amount of sweetening medium may be added to produce any desired final product. As the above examples indicate, the concentration of the sweetening syrup, as well as the total quantity of sweetening constituents, may vary.

The sugars purity of the syrup employed will also enter into the determination of the quantity of sweetening medium to be added. The Brix concentration of the syrup is a satisfactory general guide so long as the sugars purity of the various syrups is the same. By sugars purity is meant the percent sugars present based on the total weight of the dissolved solids. For example, the sugars purity of the syrup employed in the example above was about 94%, meaning that 94% of the total dissolved solids was sugars, the remainder of the dissolved solids being substantially all inert material.

Referring now to particular types of products, it is pointed out that the governing factor in the determination of the quantity of sweetening medium to be added to fruit juices is the sugar deficiency of the product. Certain juices, such as apple juice or orange juice, do not, in general, require sweetening. Grapefruit juices, on the other hand, may be materially improved by the addition of sweetening in accordance with the present invention. Because the sweetening media of the present invention correspond in composition to the sugars naturally present in fruit, they blend better in grapefruit juice, for example, than does sucrose to provide a sweetened grapefruit juice which is highly palatable.

Fruit nectars are prepared with varying ratios of sugar syrup and juicy fruit pulp. The proportions of fruit pulp and syrup and the Brix concentration of the latter depend principally upon the grade of fruit nectar to be prepared, and the type of fruit used. An apricot nectar may be prepared by mixing equal parts by volume of juicy apricot pulp and 15° Brix syrup and then sterilizing the product in sealed cans but it should be understood that both the ratio of pulp to syrup, and the Brix of syrup used will vary not only with the grade desired and type of fruit used, but also with different packers. All such variations are within the scope of the present invention. Nectars are prepared generally from pulpy fruits. As examples of other suitable fruits from which to prepare nectars, pears, plums, nectarines, peaches, or mixtures of fruits including a pulpy fruit may be mentioned.

By way of illustrating the fact that different standards apply with respect to the sweetening media of the present invention, it is pointed out that apricot nectar is now made commercially with about equal parts of apricot pulp and of 17° Brix sucrose syrup. An apricot nectar of the same grade is made in accordance with the present invention with the same proportions of pulp and syrup, but the syrup used is slightly lighter although it has an equivalent sugars purity.

In the case of canned fruits, in addition to varying with the type of fruit being canned and its condition of ripeness, the Brix of the syrup added may vary somewhat with the processing conditions by which the product is sterilized. The sterilization conditions set forth in the above example are standard conditions now employed in the canning of fruits in sucrose syrup. It should be understood, however, that the sterilization of products made in accordance with this invention may be accomplished by any of a wide variety of combinations of time and temperature, the process used being at the option of the user. The sterilization may also be promoted by other agencies in addition to time and temperature. For example, the fruit may be acidified with the aid of vacuum to decrease the time and temperature required for sterilization. It will be further understood that the various fruit compositions prepared in accordance with the present invention may be packed in any container such as glass jars, cans and the like, and may be preserved not only by sterilization with heat, as described above, but also by freezing and keeping under refrigeration, or by any other desired method.

In addition to making possible the preparation of improved fruit compositions of the type now prepared commercially, the present invention, as has already been suggested above, makes possible the preparation of new and different fruit products. The sugar composition of the sweetening media employed in accordance with the present invention is substantially the same as that of fruit, so that the addition of these sweetening media to the fruit does not materially change the sugar composition of the fruit, but instead merely increases the percentage of the natural fruit sugars present. Because of that fact, the present invention has certain unusual applications.

As is well known, commercial practice in the harvesting and transportation of fresh fruits to processing stations does not permit the full ripening of the fruit because of its perishability in the ripe state. Also, many varieties of fruit will not mature to full sugar content without the destruction of other features, such as flavor, color and texture. For example, many ripe fruits are too mealy or pithy, or too weak, to hold their shape during various processing operations employed in packing.

On the other hand, fruit, when allowed to ripen on the tree or vine on which it grows, in general increases in sugar content at it gets riper, in addition to undergoing the other changes noted above. The additional sugar present in the fruit ripened on the tree or vine gives this fruit the fully ripe, sweet fruit flavor characteristic of fresh fruit allowed to mature before it is harvested. Thus, the principal disadvantage of harvesting fruit before it is ripe is that such fruit lacks the fully ripe, sweet flavor and otherwise it is generally advantageous to harvest the fruit before it is fully ripened. The present invention overcomes the disadvantage of harvesting fruit before it is ripe since the sweetening media added to the fruit, as described herein, have substantially the same sugar composition as the fruit so that their addition to the fruit adds thereto the sugar which would otherwise have been formed in the fruit naturally if it had been allowed to become fully ripe before harvesting.

From the foregoing, it may be seen that the addition of the sweetening media to fruit, as described herein, may have two separate and distinct effects. The first effect is a ripening effect and the second is a sweentening effect. Thus, by adding to the fruit a quantity of sweetening medium in accordance with this invention, which approximately equals an amount which would be formed in the fruit if allowed to ripen before harvesting, a fruit product is produced having the desirable characteristics of tree or vine ripened fruit, and at the same time possessing the desirable characteristics of fruit harvested prior to ripening in that it has excellent flavor and color and desirable texture. The flesh of the fruit is strong and it is not mealy or pithy.

Some fruits, however, even when fully ripened on the tree or vine, are not sufficiently sweet so that addition of a sweetening medium to the fully ripe fruit is necessary, or it may be desired to form a very sweet composition with the fruit, such as a preserve, in which case additional sugar also becomes necessary. Accordingly, it is contemplated that, in accordance with the present invention, the amount of sweetening medium added may be sufficient not only to produce a ripening effect but also to further sweeten the fruit to any desired extent. In any case, the sweetening media added in accordance with the present invention, having the same sugar composition as the fruit itself, blend harmoniously with the fruit to produce a very palatable product. Instead of sweetening a fruit composition entirely with the natural sweetening media having the same sugar composition as fruits, many advantages of the invention may be obtained, if desired, by adding these sweetening media only in quantities sufficient to produce the ripening effect described above, and completing the sweetening with sucrose.

It is an important feature of the present invention that the addition of the natural sugar is accomplished without at the same time introducing into the fruit any substantial quantities of undesirable constituents, such as acids and ash-forming materials, which detract from the sweetening power of the fruit. As indicated above, the sweetening media employed are substantially free of such materials. Such non-sugar solids as are present in the sweetening media are constituents of fruits which are substantially without flavor or taste so that they have no appreciable effect on the sweetening power of the sugars and thus cannot be considered impurities.

Although it is preferred that the sweetening materials added to the fruit in accordance with this invention be largely free of sucrose, it is recognized that, although the amount thereof is small, there is some sucrose naturally present in fruit. For this reason not only the fruit itself but also the sweetening media employed in accordance with the present invention may contain a small quantity of sucrose. In short, the presence of moderate quantities of sucrose in the fruit compositions of this invention is not undesirable. It is within the scope of the invention to add some sucrose to the fruit compositions, provided there is also added along with the sucrose a substantial quantity of a sweetening medium, as described herein, which is derived from fruit and has substantially the same sugar composition as fruit but which is free of materials which detract from the sweetening power of the fruit, such as acids and ash-forming materials. It is preferred, however, that the sweetening media used in accordance with this invention shall not contain a percentage, by weight, of sucrose, based on the total weight of sugars present, which exceeds the percentage of sucrose, on the same basis, which occurs naturally in fruits.

In this application reference has been made repeatedly to the use of a sweetening medium derived from fruit, which sweetening medium has about the same sugar composition as that of fruit. Substantial freedom from materials which detract from the sweetening power of the sugars present is also stated to be a characteristic of a sweetening medium. As illustrations of such materials, acids and ash-forming materials have been mentioned. That acids detract from the sweetening powers of sugars or, to the contrary, use up sugar in satisfying their sour taste, is well-known and does not require extended discussion. Their presence obviously requires the addition of a quantity of sugar in excess of that which would be required if they were absent. The description of the undesired materials as "materials which detract from the sweetening power of the sugars" has been selected because certain ash-forming materials are undesirable also. These ash-forming materials include bitter inorganic salts and bitter salts or esters of inorganic bases with organic acids. The presence of these ash-forming materials gives to the fruit compositions a bitter, undesirable taste. They are not really sour so that they do not use up sugar to render them sweet but, on the other hand, when sugar is present in a quantity well in excess of the quantity of such bitter materials, the sweetness of the sugar may mask the bitter taste of the salts with both organic and inorganic acids. Accordingly, it may be said that they detract from the sweetening power of the sugar. In any event, their presence in the sweetening medium in substantial quantites makes it unsatisfactory for use in fruit compositions since however much the quantity of sweetening medium added be increased, the quantity of sugar present relative to the quantity of such bitter compositions does not increase but rather tends to decrease. Thus, the sweetening medium employed in accordance with the present invention should be substantially free of both sour materials and of materials which give the sweetening medium or the fruit composition to which it is added a bitter taste.

As pointed out above, the sweetening media used in accordance with this invention may and usually do contain a certain quantity of non-sugar solids which are inert, being neither bitter nor sour and having no appreciable flavor, taste, odor or color. Preferably, the sweetening media employed should be free of the color and flavor of the fruit from which they are derived, particularly if they are to be employed to sweeten a fruit other than that from which they are derived. It is within the scope of the invention, however, to use sweetening media which are not free of the color, odor, and flavor of their fruit source, particularly if the fruit to be sweetened is the same as the fruit source or if it is desired to give the fruit composition a flavor other than the natural flavor of the fruit included therein.

It is recognized that bitter or sour materials including acids, which are stated to be objectionable in the sweetening media incorporated in fruit compositions as described herein, nevertheless occur naturally in fruit. These are objectionable despite this, however, since they detract from the sweetening power of the sweetening materials present and their presence in quantities approximating those found in fruit renders the media in which they are present ineffective as sweetening media. Thus, for example, a natural fruit juice could not serve as a sweetening medium for the fruit from which it is derived because it is no sweeter itself than the fruit.

By way of establishing the improved character of the fruit compositions prepared as described herein, it is pointed out that compositions made as described in the above specific examples have been carefully tested and examined. Chemical analyses disclose that the fruit compositions contain no substantial quantity of undesirable ingredients and are in general similar to the same type products made with sucrose except for the difference in the sugar composition. The important test is made by actually eating the fruit compositions. The taste and quality of these products are in every case equal if not definitely superior to those made with sucrose, as determined by actually eating them. Such comparisons have been made not only with respect to the compositions when freshly made but also after the canned products have been stored for long periods.

A very striking difference is noted in the appearance of the canned fruit products prepared as described herein as compared with those prepared with sucrose syrup, where the comparison is made between products stored for equal lengths of time. The appearance of the products prepared as described herein is distinctly superior in many cases as compared with the products sweetened with sucrose and bears out the assertion that the sweetening media containing sugars of the same composition as the natural sugars of the fruits blend with the fruits much better than do sucrose syrups. For example, after storage for about ten days, Royal Anne cherries packed in accordance with the present invention have substantially the same appearance as when first packed, whereas Royal Anne cherries packed in sucrose syrup have in the same period of time become definitely shrunken, wrinkled and in many cases cracked. Upon further storage the sucrose packed cherries improve somewhat in appearance, indicating that an equilibrium has been reached, but they never equal the cherries packed as described herein which are already in equilibrium with the packing syrup when packed since the syrup and fruit have the same sugar composition. The Royal Anne cherries are illustrative in this respect of fruit compositions generally although in some other cases the difference is not so readily observed.

It is believed that, by reason of the equilibrium which naturally exists in the products of this invention due to the fact that the sugar composition of the sweetening syrup is the same as the sugar composition of the fruit, little or no osmosis takes place and there is no observable tendency to break down the structure of the fruit. In the packs made with sucrose equilibrium does not initially exist with the result that considerable osmosis or leaching takes place and among other things fruit acids continue to be drawn out of the fruits into solution until they have inverted substantial quantities of the surcrose to form invert sugars so that the syrup approaches an equilibrium in this manner. At the same time presumably certain quantities of the sucrose would enter into the juices held within the fruit itself. In support of this theory, although the invention is not intended to be limited by it, it has been observed as pointed out above that in fruit packed with sucrose, the appearance is very poor a short time after it is packed but that the degradation appears to reach a maximum and thereafter the fruit tends to reassume its original appearance to some extent although it is never completely recovered. This explanation is further borne out by analyses, which indicate that the total quantity of sucrose present in the packing syrup shows a substantial decrease some time after the pack is made as compared with the initial sucrose content.

It is suggested above that the present invention makes possible the production of new and different fruit compositions not comparable with any compositions now prepared commercially. For example, the sweetening media used in accordance with this invention may be added to fruit which is not canned or packaged in the usual manner but is provided for immediate use in products such as pies.

Many of the advantages of the present invention are pointed out above or may be readily inferred from the description of the products. The principal sugars present in fruits are monosaccharides as contrasted with sucrose which is a polysaccharide. It is also known that fruit contains large quantities of a particular monosaccharide, variously identified in the literature as levulose or fructose or fruit sguar, and which has a sweetening power of the order of 1.75 times that of sucrose. Whatever the sugars in fruit may be they are the same as those present in the sweetening media employed herein and they are recognized as being directly superior to sucrose for dietetic purposes. By actual test as pointed out above, the sweetening media derived from natural sources and containing as the principal sweetening ingredients the sugars naturally occurring in fruit, blend better with the fruit in the fruit compositions and produce products having an excellent flavor definitely superior to that of fruit compositions sweetened with sucrose. It has been found possible to produce equivalent sweetening as indicated by taste when using the sweetening media of this invention on the basis that they are 1¾ times as sweet as sucrose syrups. Thus the present invention makes possible the production of a superior product and at the same time gives, in effect, a substantial savings in cost.

In addition to providing superior sweetened fruit compositions the present invention also has the advantage of making possible the production of new and different types of fruit compositions. For example, fruit compositions having the ripe sweet flavor of tree or vine ripened fruit may be prepared from fruit harvested prior to the time it is ripe and when its other characteristics than sweetness are at a maximum.

It is apparent that many widely different embodiments of this invention may be made without departing from the spirit and scope thereof and, therefore, it is not intended to be limited except as indicated in the appended claims.

I claim:

1. A fruit composition comprising a fresh fruit material and a readily blendable and compatible added sweetening medium derived from fruit and having substantially the same sugar composition as fruit and containing inert non-sugar constituents of fruit and which is substantially free of acids and ash-forming materials, said sweetening medium being of such blendability and compatibility with respect to the fruit material that it enters into immediate osmotic equilibrium with the fruit material thus to preserve the original appearance of the latter over long periods of time.

2. A fruit nectar composition consisting substantially of fresh juicy pulp and an added syrup, at least the major portion of which is a sweetening medium derived from fruit and having substantially the same composition as fruit, containing inert, non-sugar constituents of fruit and which is substantially free of acids and ash-forming materials, and being of such blendability and compatibility with respect to the fruit pulp that it enters into immediate osmotic equilibruim with the fruit pulp thus to preserve the original appearance of the latter over long periods of time.

3. A fruit composition comprising a fresh fruit material and a readily blendable and compatible added sweetening medium derived from fruit and having substantially the same sugar composition as fruit and which is substantially free of acids and ash-forming materials.

4. A fruit nectar composition consisting substantially of fresh juicy pulp and an added syrup, at least the major portion of which is a sweetening medium derived from fruit and having substantially the same sugar composition as fruit and which is substantially free of acids and ash-forming materials.

5. A packaged sterilized fruit pack comprising fresh fruit and an added syrup, at least the major portion of which is a readily blendable and compatible sweetening medium derived from fruit and having substantially the same sugar composition as fruit and containing inert non-sugar constituents of fruit and which is substantially free of acids and ash-forming materials, said sweetening medium being of such blendability and compatibility with respect to the fruit that it enters into immediate osmotic equilibrium with the fruit thus to preserve original appearance of the latter over long periods of time.

6. A packaged sterilized fruit pack comprising fresh fruit and an added syrup, at least the major portion of which is a readily blendable and compatible sweetening medium derived from fruit and having substantially the same sugar composition as fruit and which is substantially free of acids and ash-forming materials.

7. A fruit juice composition consisting substantially of natural fresh fruit juice and an added syrup, at least a major portion of which is a sweetening medium derived from fruit and having substantially the same composition as fruit, containing inert, non-sugar constituents of fruit and which is substantially free of acids and ash-forming materials, and being of such blendability and compatibility with respect to the fruit juice that it enters into immediate osmotic equilibrium with the fruit juice thus to preserve the original appearance of the latter over long periods of time.

8. A fruit juice composition consisting substantially of natural fresh fruit juice and an added syrup, at least the major portion of which is a sweetening medium derived from fruit and having substantially the same sugar composition as fruit and which is substantially free of acids and ash-forming materials.

9. A method of preparing fruit compositions which comprises adding to fresh fruit a readily blendable and compatible sweetening medium derived from fruit and having substantially the same sugar composition as fruit and containing inert non-sugar constituents of fruit and which is substantially free of acids and ash-forming materials, said sweetening medium being of such blendability and compatibility with respect to the fruit that it enters into immediate osmotic equilibrium with the fruit thus to preserve the original appearance of the latter over long periods of time.

10. A method of preparing fruit compositions which comprises adding to fresh fruit a readily blendable and compatible sweetening medium derived from fruit and having substantially the same sugar composition as fruit and which is substantially free of acids and ash-forming materials.

ARVID M. ERICKSON.

References Cited in the file of this patent

UNITED STATES PATENTS

| Number | Name | Date |
|---|---|---|
| 2,499,375 | Erickson | Mar. 7, 1950 |